(12) United States Patent
Neumann

(10) Patent No.: US 12,436,597 B2
(45) Date of Patent: Oct. 7, 2025

(54) METHODS AND SYSTEMS FOR AN APPARATUS FOR AN EMOTIONAL PATTERN MATCHING SYSTEM

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

( * ) Notice: Subject to any disclaimer, the term of this patent is extended or adjusted under 35 U.S.C. 154(b) by 390 days.

(21) Appl. No.: 16/911,965

(22) Filed: Jun. 25, 2020

(65) Prior Publication Data
US 2021/0407638 A1    Dec. 30, 2021

(51) Int. Cl.
*G16H 20/70* (2018.01)
*A61B 5/00* (2006.01)
(Continued)

(52) U.S. Cl.
CPC .............. *G06F 3/011* (2013.01); *A61B 5/165* (2013.01); *A61B 5/7264* (2013.01); *G06F 18/22* (2023.01); *G06F 21/31* (2013.01); *G06N 20/00* (2019.01); *G16H 20/00* (2018.01); *G16H 20/70* (2018.01); *G16H 50/20* (2018.01); *G16H 50/30* (2018.01); *G16H 80/00* (2018.01); *A61M 2021/0044* (2013.01)

(58) Field of Classification Search
CPC ........ G16H 20/00; G16H 20/70; G16H 50/20; G16H 50/30; G16H 80/00; G16H 30/40; A61B 5/165; A61B 5/7264; G06F 3/011; G06F 21/31; G06F 21/316; G06F 21/6245; G06F 2203/011; G06K 9/6201; G06N 20/00; G06N 7/005; G06N 20/10; A61M 2021/0044
See application file for complete search history.

(56) References Cited

U.S. PATENT DOCUMENTS

2015/0154721 A1    6/2015  Thompson
2016/0246936 A1*   8/2016  Kahn ..................... G16H 40/63
(Continued)

FOREIGN PATENT DOCUMENTS

| EP | 3458969 A1 | 3/2019 |
|----|-----------|--------|
| WO | WO2002075688 A2 | 9/2002 |
| WO | WO2003015028 A2 | 2/2003 |

*Primary Examiner* — Chad A Newton
(74) *Attorney, Agent, or Firm* — Caldwell Intellectual Property Law

(57) ABSTRACT

A system for emotional pattern matching is disclosed. The system includes at least a computing device, the computing device receives current user emotional activity data from a user. The computing device generates a user state classifier as a function of state training data, where the state training data comprises a plurality of elements of past user state emotional data. The computer device identifies a current user emotional state as a function of the user state classifier and the current user emotional state data, where the current user emotional state is a function of the emotional wellbeing of the user. The computing device matches the current user emotional state to an emotional therapy. The computing device transmits the emotional therapy to a user. The method for emotional pattern matching is also disclosed.

18 Claims, 7 Drawing Sheets

(51) Int. Cl.
*A61B 5/16* (2006.01)
*G06F 3/01* (2006.01)
*G06F 18/22* (2023.01)
*G06F 21/31* (2013.01)
*G06N 20/00* (2019.01)
*G16H 20/00* (2018.01)
*G16H 50/20* (2018.01)
*G16H 50/30* (2018.01)
*G16H 80/00* (2018.01)
*A61M 21/00* (2006.01)

(56) References Cited

U.S. PATENT DOCUMENTS

| | | | |
|---|---|---|---|
| 2018/0173866 A1* | 6/2018 | Williams | G16H 40/67 |
| 2018/0174020 A1 | 6/2018 | Wu | |
| 2018/0253989 A1 | 9/2018 | Gerace | |
| 2019/0066660 A1* | 2/2019 | Liang | G06F 16/3329 |
| 2019/0266999 A1 | 8/2019 | Chandrasekaran et al. | |
| 2019/0387998 A1* | 12/2019 | Garten | A61B 5/165 |
| 2020/0214626 A1* | 7/2020 | Boyle | A61B 5/7267 |
| 2020/0342352 A1* | 10/2020 | Neumann | G06N 20/00 |
| 2021/0353224 A1* | 11/2021 | Etkin | A61B 5/245 |

* cited by examiner

METHODS AND SYSTEMS FOR AN APPARATUS FOR AN EMOTIONAL PATTERN MATCHING SYSTEM

FIELD OF THE INVENTION

The present invention generally relates to the field of machine-learning. In particular, the present invention is directed to methods and systems for an emotional pattern matching system.

BACKGROUND

Automated analysis of data and correct transmission of said data can be challenging due to the complexity of and multiplicity of data to be analyzed. Knowing which data should be transmitted to a user can be highly complex due to the unique and individual needs of each user—a problem exacerbated by the burgeoning volume of data available for analysis. Incorrect transmissions can lead to inaccuracies within systems, waste time trying to correct cumbersome issues, and ultimately frustrate users.

SUMMARY OF THE DISCLOSURE

In an aspect, a system for emotional pattern matching is disclosed. A computer device is configured to receive current user emotional activity data from a user. The computer device generates a user state classifier as a function of state training data, wherein the state training data comprises a plurality of elements of past user emotional data. The computing device identifies a current user emotional state as a function of the user state classifier and the current user emotional activity data, where the current user emotional state is a function of the emotional wellbeing of the user. The computing device matches the user emotional state to an emotional therapy by receiving emotional therapy training data, where the emotional therapy training data includes a plurality of combinations of current user emotional state and current user emotional state data and correlated emotional therapies. The computer device will generate, as a function of a machine-learning process an emotional wellbeing model as a function of the emotional response training data. The computing device will generate the emotional therapy as a function of the current user emotional state, the current user emotions state data, and the wellbeing model. The computer device is configured to transmit the response to the user.

In another aspect, a method of emotional pattern matching includes receiving current user emotional activity data from a user. The method generates a user state classifier as a function of state training data, where the state training data comprises a plurality of elements of past user emotional state data. The method identifies a current user emotional state as a function of the user state classifier and the current user emotional activity data where the current user emotional state is a function of the emotional wellbeing of the user. The method matches the current user emotional state to an emotional therapy. The method transmits the emotional therapy to the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for emotional pattern matching. The system will automatically create a response based the current state of the user and training data which may contain past user activity. The response back to the user is based on responses that match the user's current emotional state.

Figure 1:
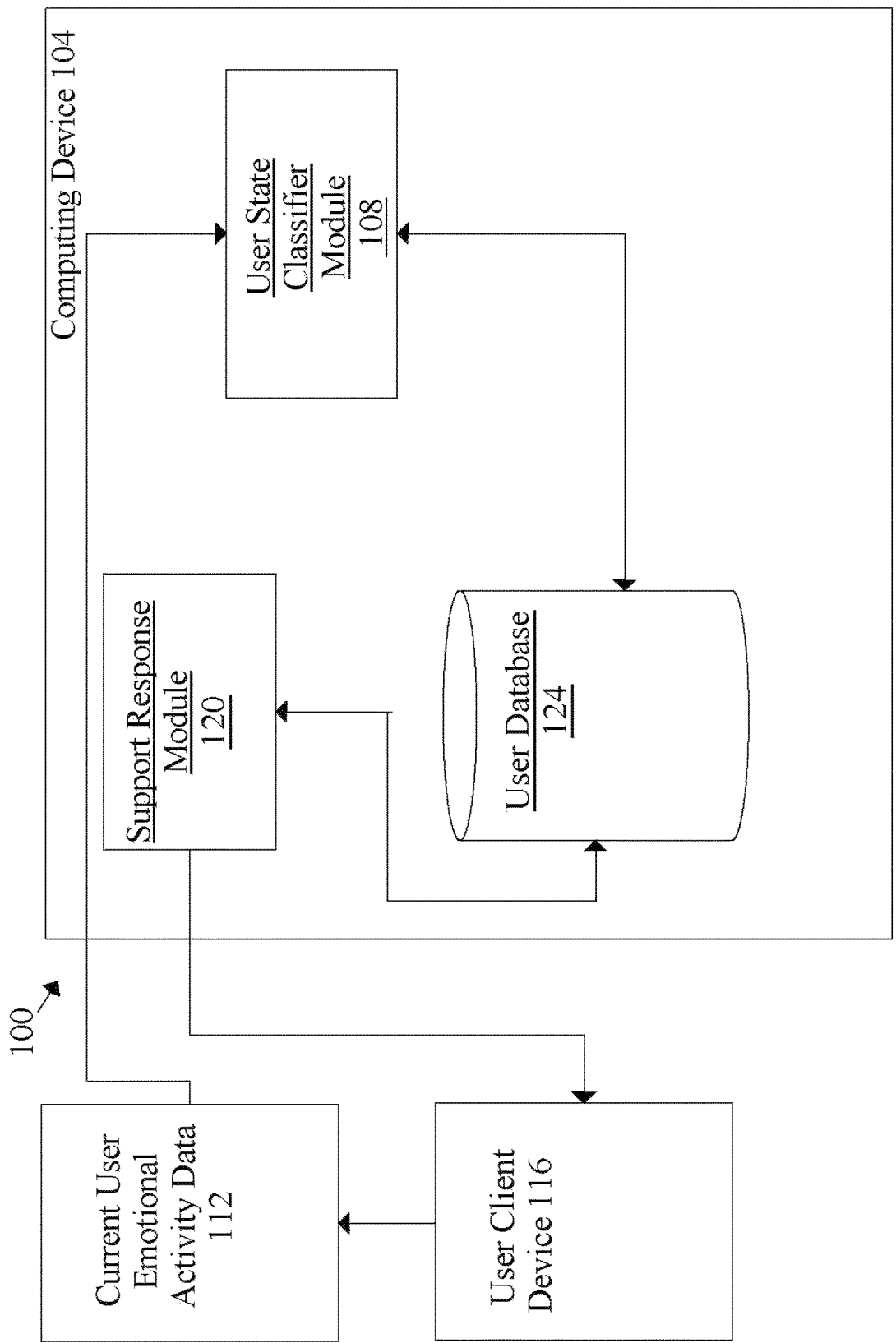
FIG. 1 is a block diagram of an exemplary embodiment of an emotional pattern matching according to an embodiment of the disclosure.

Referring now to FIG. 1, an exemplary embodiment of a system 100 for a system for emotional pattern matching is illustrated. System includes computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently, or may include two or more computing device 104 operating in concert, in parallel, sequentially or the like; two or more computing device 104 may be included together in a single computing device 104 or in two or more computing device 104. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing device, and any combinations thereof. A network may employ a wired and/or a wireless mode of communication. In general, any network topology may be used. Information (e.g., data, software etc.) may be communicated to and/or from a computer and/or a server. Computing device 104 may include but is not limited to, for example, a server or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

Continuing to refer to FIG. 1, computing device 104 and/or any module thereof may be designed and/or configured to perform any method, method step, or sequence of method steps in any embodiment described in this disclosure, in any order and with any degree of repetition. Furthermore, modules as described in this disclosure are provided for exemplary purposes to provide the functional and structural processes and/or configurations that may be used to perform processes and instantiated, whether in the form of hardware circuitry, process-based software code, machine-language, object oriented language, or programming or any other implementation that any person skill in the art, having the benefit of this disclosure may use to implement process and/or configuration as described herein; modules as described in this disclosure need not be implemented as separate modules. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, system 100 may include a user state classifier module 108 operating on computing device 104. User state classifier module 108 and/or computing device may be configured to determine a user emotional state as described in further detail below. As used in this disclosure, a "user emotional state" is an emotional or a behavioral state of mind of the current user. An emotional state may be determined using emotional data. "Emotional data," as used in this disclosure is any physiological, behavioral, and/or communicative reaction to stimuli that are cognitively processed and experienced as emotional. Emotional data may include a physiological change, such as but not limited to increased heart rate, tense stomach, and/or a cold chill. Emotional data may include any innate emotion experienced for a period of time as a reaction to an external stimulus, including but not limited to emotions such as joy, distress, anger, fear, surprise, and/or disgust. Emotional data may include, but not limited to, activities and exercises that promote positive feelings, thoughts, and/or behaviors such as, but not limited to being thankful, showing gratitude, and engaging in enjoyable activities may have a positive impact on wellbeing and negative symptoms in people. Emotional data may include secondary emotions that may not have a corresponding facial expression. Secondary emotions may include but are not limited to emotions such as love, guilt, shame, embarrassment, pride, envy, and jealousy. Secondary emotions may develop over time and may wax and wane.

Further referring to FIG. 1, for instance, and without limitation, "Happy" may be used to describe an emotional state of a user. Similarly, a user may be in a "Sad" state or a "Troubled" state. As an example, with a user state of "Happy," the responses triggered may encourage the perpetuation of the "Happy" user state. In such a case, responses such as, but not limited to, "keep doing what you are doing," or just simply, "keep it up" may be seen by the user.

With continued reference to FIG. 1, other user emotional states may include a problematic state, where the user may require assistance. A "problematic state," as used in this disclosure, is a user state where, depending on a particular user, the user state may lead to a problem for that user, but not for every user. For instance, a user may use the phrase "need a drink." If the system contains data indicating that a user is an alcoholic, the system may treat that as a problematic state and may send a response of "do not do it," or the like. Similarly, the same phrase may result in a more innocuous response back to the user such as "do not overdo it," if the system has determined that this particular user does not suffer from alcoholism. A problematic state may be identified by detection of certain words, such as, but not limited to, "gambling", "alcohol", "sex", or the like, for instance in a textual conversation as described in further detail below, where the system will identify the user state as a problematic behavior. A problematic state may be identified by an activity, such as drinking alcohol, going to a casino, watching pornography, or the like.

Still referring to FIG. 1, another non-limiting example of a user emotional state is an emergency state. An emergency state, as used in this disclosure, is a user state that places the user in imminent risk of a bad outcome such as injury, addition relapse, illness, loss of life, and/or harm to relationships with other people. Examples of emergency states may include but are not limited to suicide and/or threat thereof, a drug overdose, extreme alcohol consumption or the like. Emergency states may be identified by words, such as "hanging," "overdose, "slitting wrists," or the like. Emergency states may be identified by actions such as a user continuously using words that will trigger an emergency state. An emergency state may trigger a call by an informed advisor that may render assistance to a user. Examples of informed advisors include but are not limited to any medical professional which include doctors, nurses, health practitioners, or the like. An emergency state may trigger a call to a facility. Facilities include, but are not limited to hospitals, suicide prevention centers, an alcohol treatment center, or the like.

Still referring to FIG. 1, another non-limiting example of an emotional state may be a challenge state. A challenge state, as defined in this disclosure is a user state represents a user state involving a long term or chronic habitual threat to a user's health. A challenge state may be identified by words such as "cigarette," foods that contain high fat or cholesterol, foods that contain high amounts of sugar, or the like. A challenge state may be identified by actions by the user. For example, a user may indicate that they are about to smoke a cigarette or use smokeless tobacco. Based on past user activity, the system may respond back with "Please do not do it," or the like if the system knows that the user suffers from asthma or emphysema, or other pulmonary ailments. The system may also respond with a text or a link to an informed advisor where the user can select the link and be in contact with the informed advisor.

Still referring to FIG. 1, computing device 104 is configured to receive current user emotional activity data 112 from a user. As defined in this disclosure, current user emotional activity data is data provided by the user that describes a present user activity indicative of a current emotional condition; a "present" and/or "current" activity and/or emotional state, as used in this disclosure, is an activity and/or emotional state that is occurring at or near a time at which computing device receives current emotional activity data, such as an emotional state of a user that is still extant after transmission of user emotional activity data to computing device 104. Examples of current user emotional activity data include but are not limited to a feeling such as happy or sad; a picture showing, for example, a picture of an event or a person that triggers an emotion in a user; a song or any audio file that triggers a memory in a user. User may use, for example, a user client device 116 such as a smartphone to transmit current user emotional activity data 112 to the computer device 104; transmission may alternatively or additionally occur automatically. Any device that integrates communication functions such as voice calling, and Internet access may be examples of a user client device 116 that a user may use to transmit current user emotional activity data 112. Further examples of current user emotional activity data will be apparent to persons of skill in the art upon reading the entirety of this disclosure, and may include, without limitation, indications of activities user is engaging in and/or planning to engage in to react to and/or precipitate a current emotional state; for instance, and without limitation, a user who has a habit of consuming a certain food, recreational drug, alcoholic beverage, and/or media product such as a pornographic video when depressed or sad may be associated with current user emotional activity data describing such actions and/or activities leading to them. For instance, navigational facilities of a user device, such as without limitation global positioning systems (GPS) may detect that user is traveling to a location associated with a particular emotional state. As a further non-limiting example, user may enter in a textual conversation with computing device 104 and/or with another person and/or device one or more statements indicative of a particular emotional state. As an additional non-limiting example, user may engage with computing device 104 and send a clip of a movie may trigger a happy or a sad emotion in the user. The user may, for example, upload a newspaper article about a particular subject that may contain words that will trigger a certain emotion in the user. For instance, the user may include an obituary notice about a family member that triggers a sad emotional state in the user.

With continued reference to FIG. 1, current user emotional activity data may be received using a support response module 120 operating on computing device. Support response module 120 operating in computing device 104 may be configured to receive, from a remote device, an indication that the user is engaging with the support response module 120. Remote device may include a device operated by user, such as without limitation user client device 116; for instance, user may provide the input for the purposes of receiving emotional therapy. Alternatively or additionally, another person, potentially from a different remote device, may report that user is engaging in and/or has recently engaged in a given activity. For instance, a family member, neighbor, spouse, boyfriend, girlfriend, ex-boyfriend, ex-girlfriend, religious leader, co-worker, or the like may observe user engaging in problematic behavior, such as a drinking binge, a visit to an adult entertainment institution, an excessive shopping spree, weekend at a casino, a hit of an addictive drug, or the like. Current user emotional activity data may be received in the form of user location and/or direction of travel data.

Still referring to FIG. 1, the system may be configured to enable two step authentication. Two step authentication may be required in order to comply with the requirements of the Health Insurance Portability and Accountability Act (HIPAA) and the General Data Protection Regulation (GDPR). Two step authentication may ensure that the user is identified property and to secure the information before the user sends current activity data 112 or receives a response. Other examples of security measures to protect the individual include, but are not limited to encryption of responses, requiring strong passwords, like 15-character passwords, or the like.

Still referring to FIG. 1., the support response module 120 operating in computing device 104 may be configured to transmit a plurality of emotional therapies based on current user emotional activity data 112 to the user client device 116. For example, a user may receive a variety of emotional therapies that will require the user to select one or more emotional therapies. Support response module 120 and/or computing device 104 may then receive at least one response selected by a user. In a non-limiting example, this may resemble answers presented to a user in a multiple-choice format where the user selects one or more appropriate emotional therapies presented to them. An option presented to user with emotional therapies may include a word such as, but not limited to "End" that will end transmission of the responses to the user. User may select a word that ends transmission at any point during an exchange of responses between support response module 120 module and the user. Support response module 120 may include a timeout value where, if user does not select a response, transmission may be ended. System 100 may be configured to retrieve a response from a wellbeing response repository, as described in further detail below, as a function of a current user emotional state and user activity data.

Still referring to FIG. 1, support response module 120 and/or computing device 104 may be configured to send emotional therapies in a language selected by the user. A user may be able to select a preferred language selected by the user. This may include, but not limited to, English, Spanish, French, Italian, German, and the like. Support response module 120 may be configured to default to English once an "End" response has been selected by a user.

Alternatively, or additionally, the support response module 120 may be configured to default to English if a timeout period is reached.

Still referring to FIG. 1, support response module 120 operating in computing device 104 may detect a conference event based on at least a user input. A conference event, as defined in this disclosure, is an event that may require communication of a user with another party. User may create an authorization list of authorized contacts. Authorized contacts may include, without limitation, a user's spouse, the user's immediate family—mother, father, any brothers and/or sisters, or any other family member selected by the user. Authorized contacts may also include any friends, co-workers, or the like. Authorized contacts may include religious leaders, such as but not limited to members of the clergy, a priest, a rabbi, an Imam, or the like. Authorized contacts may include a facility which may include, but not limited to wellness centers, a religious institution, a private clinic, or the like. A support response module 120 may select an authorized contact as a function of a location of a user. For example, support response module may detect based on geolocation or positioning which of the authorized contacts may be located closest to the user and initiate a conference event with that authorized contact. As a non-limiting example, user's device such as but not limited to a smartphone may transmit coordinates about a location of the user which may enable support response module 120 to use those coordinates and select a contact from authorized contact list who is closer in location to the user.

With continued reference to FIG. 1, system 100 may be configured to perform a user textual conversation with a user. For example, computing device may be configured to perform a user textual conversation with user client device 116 of a user. A "textual conversation," as defined in this disclosure, is a conversation involving either text or messaging that is interactive. Computing device 104 may provide output to an advisor client device, which may be operated by any user authorized for conference as described above, and/or user client device 116. Computing device 104 may receive inputs from an advisor client device and/or user client device 116. Inputs and/or outputs may be exchanged iteratively using, for example, messaging services and/or protocols, including without limitation any instant messaging protocols. Based on inputs received from user, system may determine what the potential issue affecting the user is and relevant responses. Persons skilled in the art, upon reviewing the entirety of this disclosure, will be aware of a multiplicity of communication protocols that may be employed to exchange text messages as described herein. Text messages may be provided in textual form and/or as audio files using, without limitation, speech-to-text and/or text-to-speech algorithms. Computing device 104 may be configured to generate at least a textual output using diagnostic output and at least a user input, as set forth in further detail below.

With continued reference to FIG. 1, a user may initiate a textual conversation with the system 100 by using a text messaging protocol; system 100 may alternatively or additionally initiate a textual conversation with user, including without limitation using a text messaging protocol. Text messaging may include instant messaging protocol, such as, but not limited to Bitmessage, Bonjour, Matrix, short message service (SMS), or the like. Text messages can be classified in different categories depending on the subject of the message by processing the messages using, for example, natural language processing. Text messages and/or textual communication may include, without limitation, messages displayed and/or received using audio input and/or output devices, including using text-to-speech and/or speech-to-text technology.

Still referring to FIG. 1, computing device 104 may be configured to use natural language processing to classify different responses from, for example text messages, as a unit. Natural language classification algorithms may be implemented, without limitation, as disclosed in U.S. application Ser. No. 16/372,540, filed on Apr. 2, 2019, and entitled "ARTIFICIAL INTELLIGENCE ADVISORY SYSTEMS AND METHODS FOR VIBRANT CONSTITUTIONAL GUIDANCE", which is incorporated by reference herein in its entirety. A unit, as defined in the disclosure, is a series of words that contain a related theme. For example, a textual conversation may contain words or phrases such as, but not limited to, "I feel bad," I am sad" and "I am lonely." All of these messages may signify a theme that the user is sad and may be classified as "Sad" state. This theme may be different, if for example, the textual conversation has messages such as, but not limited to, "I feel bad," I am sad," and "I can't live anymore." In the latter case, the combination of text messages may be classified, for example, as an "Troubled" or another state indicating that the user needs assistance. These messages may trigger a link or a call from an informed advisor to check on the wellbeing of the user. Another non-limiting example may include, a text message, such as "I need a drink." In this case, the user may have a history of alcohol abuse which is data stored in a past user activity database 304 in a user database 124 as described in further detail below. Classification may be different if user does not have a history of alcohol abuse. This may result in a less serious classification such as "Challenged." This in turn may result in benign responses such as "watch your calories" or "drink water," or the like.

With continued reference to FIG. 1, computing device 104 may be configured to classify image files into categories, for instance using one or more classification algorithms and/or classifiers as described in further detail below. A textual conversation may include one or more image files. Image file formats include, but not limited to, Joint Photographic Experts Group (JPEG), Portable Network Graphics (PNG), Graphics Interchange Format (GIF), Tagged Image File (TIF), Portable Document Format (PDF), Encapsulated Postscript (EPS), Raw Image Files (RAW), or the like. A user may capture an image using a device in a user client device 116. Devices may include, without limitation a mobile camera, a scanner, a digital camera, a tablet computer, or the like. A user may capture a picture of a location during a textual conversation between user and user state classifier module 108. For example, a user may have a gambling addiction which is included in a past user activity database in a user database as described in further detail below; the ser may capture an image of a casino, which may result in a classification of "Problematic" by a user state classifier as described in further detail below after processing of the image using natural language. System may respond with a message of, for example, "do not enter the casino," or "leave the casino," or the like. The system may also respond with a text with a number for an informed advisor, or the like.

With continued reference to FIG. 1, a textual conversation may include one or more audio files. Audio file formats may include, but not limited to .mp3, .m4p, .au, .raw, and the like. A user may capture an audio file using a device in a user client device 116. Devices include, but not limited to an audio recorder software, a texting application with audio recording capability in a smartphone, a tablet computer, or the like. A user may initiate a textual conversation using voice rather than a text file. Audio file processing may include algorithms such as the Mel-frequency cepstral coefficients (MFCCs) algorithm. For example, a user, using a messaging application with audio recording capability, may initiate textual conversation and say "I am not feeling well." The audio file may be processed and classified by the user state classifier module which may result in a classification of "Challenged" or "Problematic, or the like based on inputs from the user during the textual conversation. A user may capture an audio of a location during a textual conversation between the user and the user state classifier module 108. For example, a user may have a gambling addiction which is included in a past user activity database in a user database as described in further detail below. User may capture an audio file in a casino, which may result in a classification of "Problematic" by a user state classifier after processing of the audio file.

With continued reference to FIG. 1, system 100 may include a user database 124. user database 124 may be populated with one or more relationships between labels, objects, themes, or the like, as introduced in further detail below, and problematic behaviors and/or negative behavioral propensities; such relationships may be entered in user database 124 by users, where user entry may include entry by one or more expert users such as psychologists, medical experts, or the like, "crowd-sourced" entry by large numbers of users, which may be aggregated, or the like. Where user entries are aggregated, aggregated results may include comparison of aggregated values to threshold numbers; for instance, a relationship between a given label and a problematic behavior and/or negative behavioral propensity may be recorded where more than a threshold percentage of user entries have identified the two as linked. User database 124 will be further described below.

Figure 2:
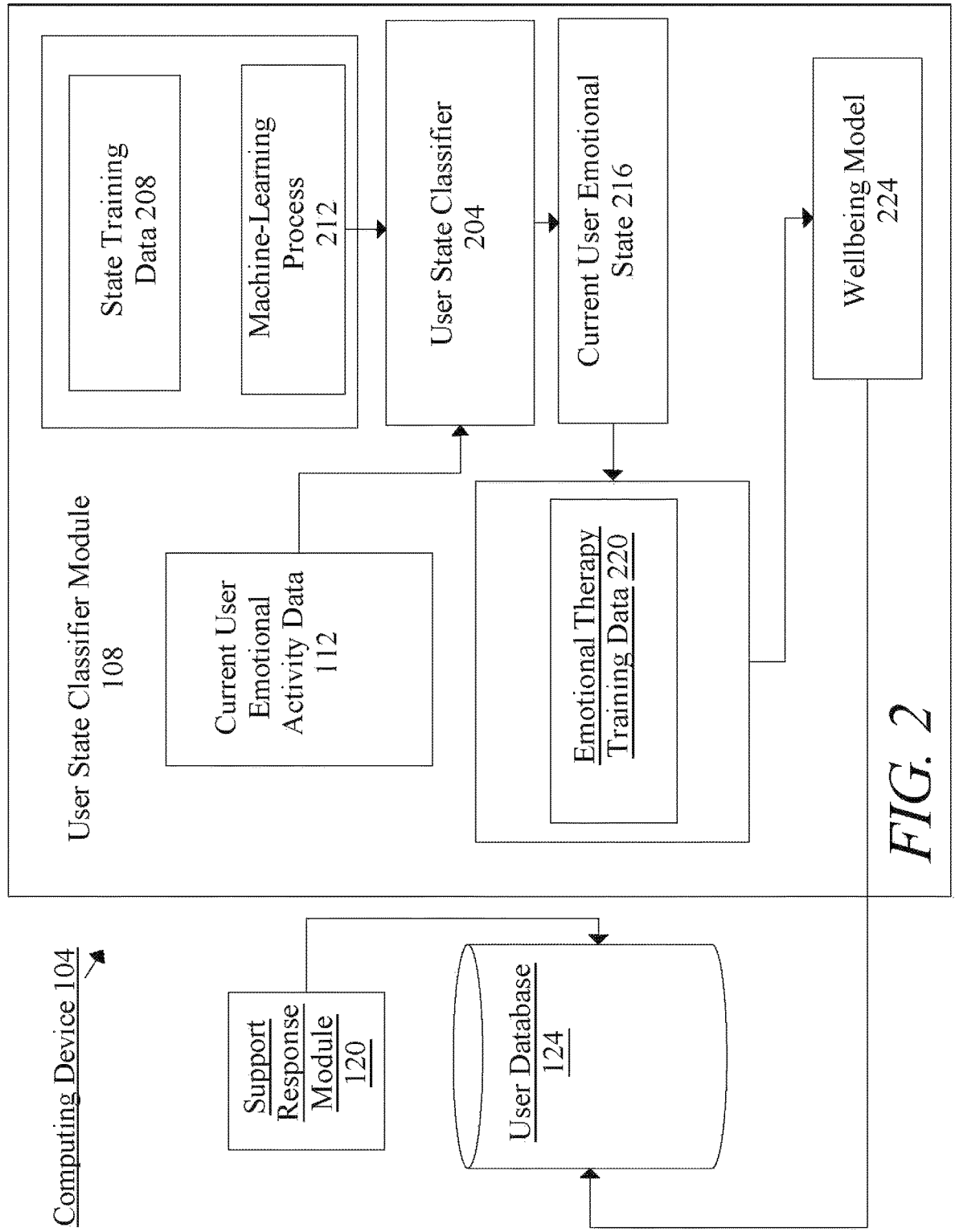
FIG. 2 is a block diagram of an exemplary user state classifier module according to an embodiment of the invention.

Now referring to FIG. 2, computing device 104, user state classifier module 108 and/or computing device 104 generates a user state classifier 204 based on state training data 208 where the state training data 208 includes past user emotional activity data correlated with elements of past user emotional state data. Computing device 104 may generate user state classifier 204 using a machine-learning process 212 such as any classification algorithm, defined as a processes whereby a computing device 104 derives, from state training data 208, a model known as a "classifier" for sorting inputs into categories or bins of data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Further referring to FIG. 2, labels and/or data used in and/or identified by user state classifier 204, including without limitation any use state classifier, may be stored in any suitable manner, including without limitation in a user database 124. Data entries in a user database 124 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a user database 124 may reflect categories of data consistently with this disclosure.

Still referring to FIG. 2, training data, as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 2, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by computing device 104 may correlate any input data as described in this disclosure to any output data as described in this disclosure. For example, training data associated with the user state classifier of "Emergency" state, may have inputs like, suicide, overdose, death, or the like, which may be a part of the current user activity or the activities of other users. The system may recognize these inputs and send an output like "I'm getting you help," or a text with a number to call an informed advisor, where output may be generated as an emotional therapy as described in further detail below.

Still referring to FIG. 2, state training data 208, may include, without limitation, a plurality of elements of past user emotional activity data correlated with elements of past user emotional data. State training data may include elements specific to a current user. For example, past use emotional activity data, such as a walk in the woods, may be correlated to a state of happiness for a current user. State training data may also contain past user activity data indicating that a walk in the woods may trigger an emotional state of, for example, "Trouble," as that walk in the woods may trigger an alternate emotion from "Happy." Each data entry may include one or more themes and/or objects and past user state activity data from user. User state training data containing past user activity data and/or elements thereof may be entered by users, for instance via graphical user interface forms; as a non-limiting example, each such form may present to a user a geometric form, word, image, or the like, and a user may select a label of an emotional state and/or emotional activity datum for each such geometric form, word, image, or the like from a list of labels provided to the user and/or may enter one or more words in a text entry element, which may be mapped to labels using language processing as described below. User state training data containing past user activity data and/or elements thereof may be obtained by user's historical entries. Past user state activity data is stored in user database 124. As a non-limiting example, a user may enter a user state indicating a challenge state; data stored in past user activity database is used to build training data used to generate a user state classifier 204. As an embodiment, the training data used by the user state classifier module includes past user activity data from a plurality of users. For example, a past user activity database in user database 124 may act as a repository for user data containing past user activity data for all users. Once a user state classifier is generated, the data may be transferred to a user historical database 308 in user database 124 for use as state training data 208.

Still referring to FIG. 2, language processing algorithm may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. in such models, a hidden state to be estimated may include an association between at least a word and/or phrase and an object label and/or an additional word. There may be a finite number of labels, words and/or phrases, and/or relationships therebetween; an WHIM inference algorithm, such as the forward-backward algorithm or the Viterbi algorithm, may be used to estimate the most likely discrete state given a word or sequence of words. Language processing algorithm may combine two or more approaches. For instance, and without limitation, machine-learning program may use a combination of Naive-Bayes, Stochastic Gradient Descent (SGD), and parameter grid-searching classification techniques; the result may include a classification algorithm that returns ranked associations.

Continuing to refer to FIG. 2, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 2, language processing algorithm may use a corpus of documents to generate associations between language elements in a language processing algorithm, and computing device 104 may then use such associations to analyze words extracted from one or more documents and determine that the one or more documents indicate a given relationship between at least a word and/or phrase and an object label and/or an additional word. In an embodiment, computing device 104 may perform this analysis using a selected set of significant documents, such as documents identified by one or more users and/or expert users, and/or a generalized body of documents and/or co-occurrence data, which may be compiled by one or more third parties. Documents and/or co-occurrence data may be received by computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, computing device 104 may automatically obtain the documents, co-occurrence data, or the like by downloading and/or navigating to one or more centralized and/or distributed collections thereof. Computing device 104 may alternatively or additionally receive any language processing model from one or more remote devices or third-party devices and utilize such language processing model as described above.

Still referring to FIG. 2, user state classifier module 108 and/or computing device 104 may be configured to generate a user state classifier 204 using any suitable classification process, including without limitation a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, user state classifier module 108 and/or computing device 104 may be configured to generate a user state classifier 204 using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of user-entered words and/or phrases, and/or other user emotional activity data, to clusters representing user emotional states.

User state classifier 204 may relate themes and/or objects to clusters corresponding to emotional states and/or activity data. Themes that are related to similar emotional states and/or activity data may be grouped together, while themes with unrelated emotional states and/or activity data may have dissimilar properties and/or features. For example, activities where the user's emotion denote happiness like listening to a particular song or going to a beach may all be clustered together and classified as a happy emotional state for the user. Where user state classifier 204 is updated, for instance by adding to a list of negative emotional states, for example, sadness corresponding to clusters and rerunning user state classifier 204 to classify the updated list, principal themes and/or objects stored in memory may be subjected to user state classifier 204 again to update association of principal themes and/or objects with negative emotional states. User state classifier 204 may be run against one or more sets of state training data 208, where state training data 208 may include any form of training data as described above.

Still referring to FIG. 2, user state classifier 204 may alternatively or additionally be customized to user. For instance, and without limitation, user state classifier 204 created using state training data 208 as described above may be modified using augmented or updated training data matching, for example, negative emotional propensities and/or negative emotions to particular proclivities of user. For instance, and for the purposes of illustration only, if a user is experiencing a feeling of loneliness, user state classifier 204 may be generated to associate images, words, or other content elements related to user's particular events, words, places that cause the user to feel loneliness. For example, a user may associate a particular date with an end to a relationship leading to a feeling of loneliness. Another non-limiting example may include a place, such as a hospital, where the user may feel lonely due to a loss of a loved one at that hospital. Elements of user state classifier 204 that correspond to such person-specific proclivities may be received from users, including user and/or other persons such as family members, friends, purveyors of content, spouses and/or "significant others" of user, ex-spouses, ex-boyfriends, ex-girlfriends, religious and/or psychological advisors, or the like. Alternatively or additionally, an object classifier may be used to identify relative frequency of appearance of particular visual and/or textual elements in media consumed by user; for instance, a visual object classifier, for example, may be run against a series of media selections by the user may identify one or more visual and/or textual objects that appear related to the user's addictions. System may match such items to an emotional state via a user-modified user state classifier 204, for instance by adding clusters and/or labels to a user state classifier 204. As a result, such elements may also be identified, via database lookup and/or user state classifier 204, as matching an emotional state. User's response to an emotional therapy may be used as an additional input and be used to generate an updated user state classifier 204. For example, a user may respond to a questionnaire or a request for feedback based on a suggested emotional training; the user may respond that the therapy mischaracterized the user's emotional state, in which case the information provided may be used to retrain user state classifier 204 based on the user' input. User may provide this input in, for instance, a text message, an audio recording, a video clip, a document, or the like. The user input may also be incorporated into the state training data 208. For instance, based on the user input, state training data 208 may be updated with the user input as indicated above to may be used to generate a updated user state classifier 204. Updated user state classifier may subsequently output different user emotional states when provided user emotional activity data.

Still in FIG. 2, computing device 104 and/or user state classifier module 108 may identify a current user emotional state 216 using user state classifier 204 and at least an element of the current user emotional activity data 112, where the current user emotional state as a function of the emotional wellbeing of the user. As defined in this specification, a current user emotional state 216 is an emotional user state of a current user identified from current user emotional activity data 112. User state classifier 204 that classify the user as "Happy" may identify a current user emotional state such as, but not limited to 'Thankful,' "Relieved," or "Relaxed" where the emotional wellbeing of the user is one of balance and full of positive sense. In contrast, user state classifier 204 that classify the user as "Sad" may identify a current user emotional state such as, but not limited to 'Disappointed," "Mournful," or "Depressed" where the emotional wellbeing of the user is one of imbalance and full of negativity. Current user state values may be stored in in user database 124 For instance, once the user state classifier 204 is generated and stored in user database 124, user state classifier module 108 will use the current user state classifier 204 and a current user emotional activity data 112 to identify a current user emotional state 216. For example, current user emotional activity data 112 entered by a user may place the user at a beach which may generate a user state classifier of "Happy" which may identify a current user emotional state of "Relaxed" Another non-limiting example, current user emotional activity data 112 entered by a user may place the user at a cemetery which may generate a user state classifier of "Sad" which may identify a current user emotional state of "Mournful."

Still referring to FIG. 2., the user state classifier module 108 and/or computing device 104 may receive emotional therapy training data 220, which may include a plurality of emotional behaviors and correlated emotional therapies. An "emotional therapy," as described in this disclosure, is a response designed to aid a user having a given emotional state in achieving a different emotional state. Such associations between emotional therapies and emotional states may be populated in emotional therapy training data based on expert inputs and/or on established wellbeing models such as the Six Factors of Psychological WellBeing model, or the like. For instance, and without limitation an "emotional therapy" may include a textual, visual, video, and/or audio output to a user as described in further detail below, such as a statement and/or question that aids user in improving and/or changing emotional state, a reminder of a strategy for emotional health that user may use to improve emotional state, and/or a suggestion to communicate with another person and/or entity that may be able to aid user in modifying user's emotional state.

In an embodiment, and still referring to FIG. 2, emotional therapy may include a conference initiator. As used in this disclosure, a "conference initiator" is defined as a link provided to users so that, once selected, a conference that includes the user is initiated, for instance and without limitation upon detection of a conference event. Link may include, without limitation, a phone number, a link to a video conference, or the like. Conference initiator may be transmitted to a second user client device of a second user. Second user may be, for example, a doctor, nurse, nurse practitioner, a health practitioner, police, fire department, or the like. Second user may also include user's family members, a member of the clergy, rabbis, an Imam, or the like. Second user may include a health care facility such as substance abuse center, alcoholism treatment center, a mental health facility, or the like. Support response module 120 may facilitate a conversation between first user and second user. This conversation may be audio only or may include video.

For example, computing device may receive emotional therapy training data 220 that may include behaviors such as crying and/or words and/or actions associated with a state of sorrow as described above with a correlated response such as "do you need to talk to someone?" Computing device 104 may generate, using a machine-learning process 212, a wellbeing model 224 relating responses and behaviors. As defined in this disclosure, wellbeing is the state of being healthy, happy, and prosperous. A machine-learning process is a process that automatically uses a body of data known as "training data" and/or a "training set" to generate an algorithm that will be performed by a computing device 104/module to produce outputs given data provided as inputs; this is in contrast to a non-machine-learning software program where the commands to be executed are determined in advance by a user and written in a programming language. Examples of machine-learning types include supervised and unsupervised machine-learning. Supervised machine-learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised machine-learning process may include a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Machine-learning processes may include unsupervised processes. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like. Unsupervised machine-learning algorithms may include, without limitation, clustering algorithms and/or cluster analysis processes, such as without limitation hierarchical clustering, centroid clustering, distribution clustering, clustering using density models, subspace models, group models, graph-based models, signed graph models, neural models, or the like. Unsupervised learning may be performed by neural networks and/or deep learning protocols.

Still in FIG. 2, support response module 120 and/or computing device 104 may configured to match the current user emotional state 216 to a response. Matching many include, for example, querying user database 124 where a record is returned listing a response matching the current user state 216. For example, computing device 104 may identify a problematic behavior by querying a user database 124. User database 124 may include any data structure for ordered storage and retrieval of data, which may be implemented as a hardware or software module. User database 124 may be implemented, without limitation, as described above. Data entries in a user database 124 may be flagged with or linked to one or more additional elements of information, which may be reflected in data entry cells and/or in linked tables such as tables related by one or more indices in a relational database.

Still referring to FIG. 2, support response module 120 and/or computing device 104 may transmit emotional therapy matching the current user emotional state 216 to the user. For instance, the user may receive a response that is not textual. Non-limiting examples include a video, a picture, a video chat, or the like. The user may also receive a textual response. For example, the user may receive a text message, an email response, a hypertext link, or the like. The user may also receive a mixed format response, where the user receives both a textual and a non-textual response. This includes, but not limited to a user receiving a video movie with an accompanying hypertext link that the user may select.

Figure 3:
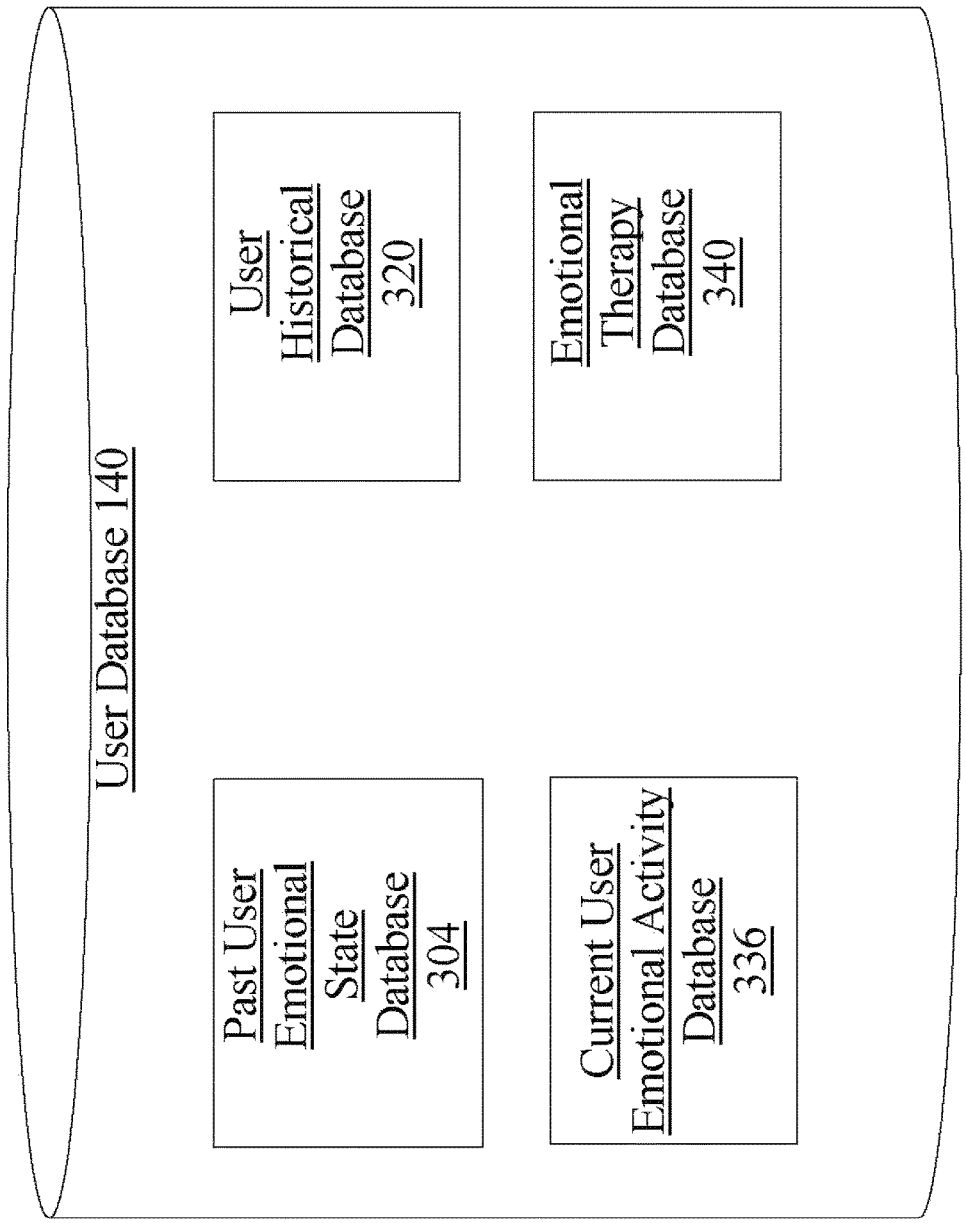
FIG. 3 is a block diagram illustrating an exemplary user database according to an embodiment of the invention.

Now referring to FIG. 3, an exemplary embodiment of a user database 124 is described. As a non-limiting example, one or many elements of past user emotional state data may be stored in and/or retrieved from one or more past user activity tables inside a past user emotional state database 304 in user database 124. One or elements of data in past user activity database 304 may include, but not limited to, historical data of activities for a particular user. Past user emotional state database 304 may include past user data related to an emotional state of the user prior to a current activity. A past user emotional state database 304 may include any data structure for ordered storage and retrieval of data, which may be implemented as a hardware or software module. A past user emotional state database 304 may be implemented, without limitation, as a relational database, a key-value retrieval datastore such as a NOSQL database, or any other format or structure for use as a datastore that a person skilled in the art would recognize as suitable upon review of the entirety of this disclosure. past user emotional state database 304 may include a plurality of data entries and/or records corresponding to elements of physiological data as described above. Data entries and/or records may describe, without limitation, data concerning particular past user activity data that has been collected for a user. Data entries in a past user emotional state database 304 may be flagged with or linked to one or more additional elements of information, which may be reflected in data entry cells and/or in linked tables such as tables related by one or more indices in a relational database; one or more additional elements of information may include data associating a past user data and/or a person from whom a past user activity data was extracted or received with one or more cohorts, including demographic groupings such as ethnicity, sex, age, income, geographical region, or the like, one or more common diagnoses or physiological attributes shared with other persons having biological extractions reflected in other data entries, or the like. Additional elements of information may include one or more categories of data as described above. Persons skilled in the art, upon reviewing the entirety of this disclosure, will be aware of various ways in which data entries in a past user emotional state database 304 may reflect categories, cohorts, and/or populations of data consistently with this disclosure.

Still referring to FIG. 3, user database 124 may include a user historical database 308. User historical database 308 may include a table or tables of, but not limited to, historical emotional data for a plurality of users. User historical database 308 may include past user emotional data related to the emotional state of the user prior to a current activity. The user historical database may include data that may be used as, for instance, as state training data 208. A table or tables in user historical database 308 may include, but not limited to values matching a current user emotional activity data 112 to a response for a plurality of users. Data populating the user historical database 308 is transferred to the user historical database table or tables in user historical database 308 in user database 124 for use as training data once a user state classifier is generated. The data structure for the user historical database 308 may be, but not limited to, as described above.

Still referring to FIG. 3, the user database 124 may include a current user emotional activity database 312 which may include one or more tables of current user emotional state value. Current user emotional activity database may include a table or tables of, without limitation, current user emotional state values identified from the current identifiers and an element or elements of the current user emotional data 128. Data structure for the current user state database 312 may be implemented, without limitation, as described above.

Still referring to FIG. 2, the user database 124 may include an emotional therapy database 316 which may include one or more tables of responses. One or more tables in response database 316 may include, without limitation, the responses from using a wellbeing model relating current user emotional activity data 112 and behaviors. Data structure for the responses database may be implemented, without limitation, as described above.

Figure 4:
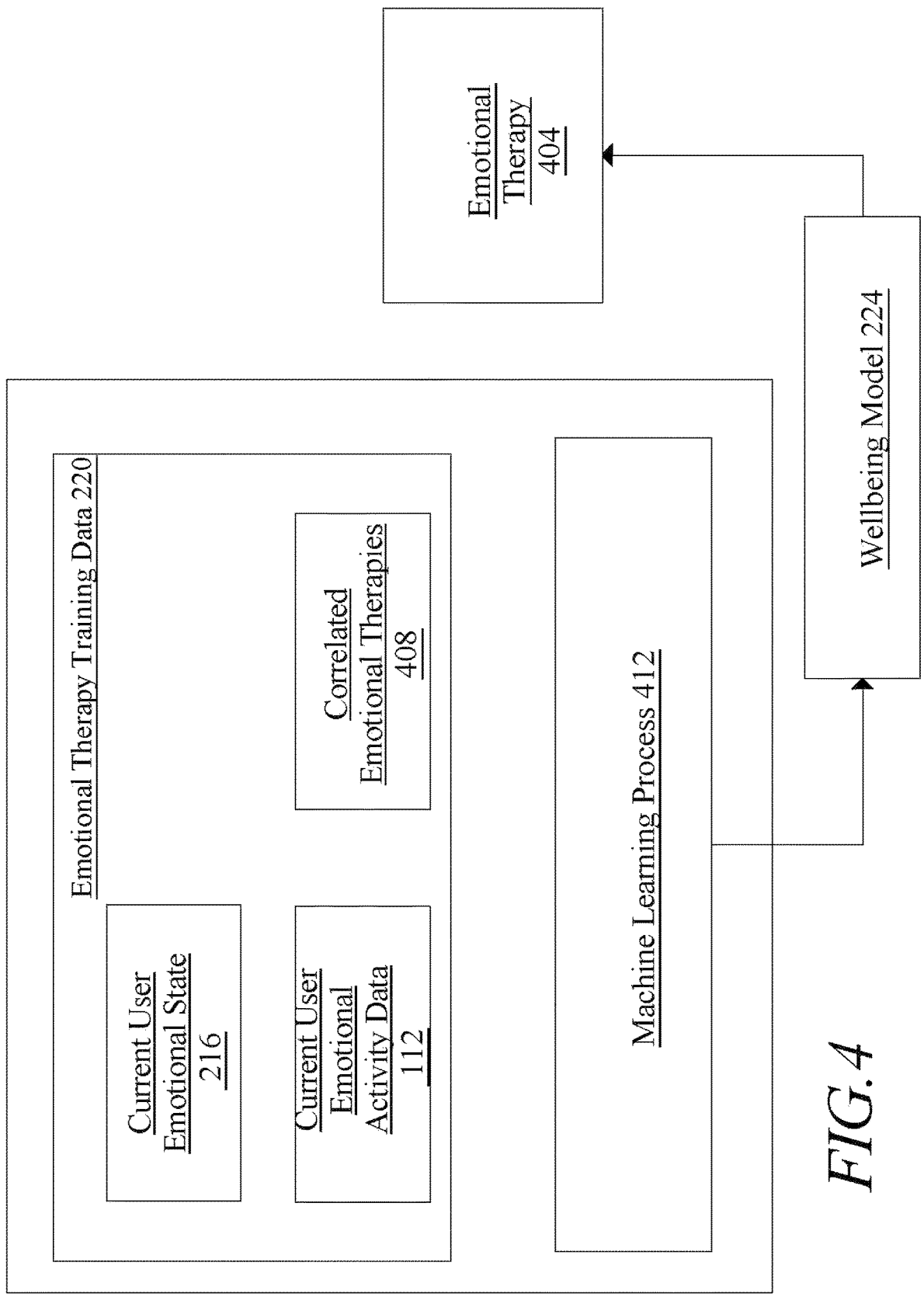
FIG. 4 is a block diagram of an exemplary embodiment describing how a user emotional state is matched to an emotional therapy.

Now referring to FIG. 4, an exemplary embodiment describing how a user emotional state is matched to an emotional therapy is shown. Computing device 104 may be configured to match a current user emotional state 216 to an emotional therapy 404. As defined in this disclosure, an "emotional therapy" is a response to a user's input based on how an emotion will help the individual make a better choice or guide the individual to make a better decision. For example, an individual experiencing a bad day may experience a feeling of relaxation or calmness if the individual goes for a walk. In this case, going for a walk may be a better choice than, for example, going for a drink. Going for a walk may help the individual in his decision making and may trigger a more positive response. Computing device 104 may receive emotional therapy training data 220. Emotional therapy training data 220 includes multitude of combinations of current user emotional state 216 and user emotional state data 128 and correlated emotional therapies 408. The emotional therapy training data 220 is processed by a machine-learning process 412. Machine-learning process 412 may or may not be identical as machine-learning process 308. Non-limiting examples of machine-learning processes that may be used to process emotional therapy training data 220 have been described above. For instance, current user emotional state 216 may reflect that the user is feeling anxious. Non-limiting examples of emotional therapies may include verbal instructions presented for instance in audio or textual form, such as "go for a walk,", "reach out to a friend or family member," "listen to some music," or the like. The response may be in the form of a question. For instance, "did you have a bad day?", "did you exercise today?", "is someone causing you to be anxious?', or the like. Other types of responses may include video clips, audio clips, hypertext links or the like for directing user to a person pursuant to a conference event and/or to an online resource that may assist user with emotional state, text messages which may include phone numbers, or the like.

Still referring to FIG. 4, computing device 104 may generate using a machine-learning process 412 an emotional wellbeing model 224 as a function of the emotional response training data 220; wellbeing model may include any machine-learning model as described above. As used in this disclosure, "wellbeing" is a state of being healthy, happy, and prosperous; wellbeing model may generate one or more emotional therapies designed to aid a user having a given emotional state in achieving a different emotional state. Such associations between emotional therapies and emotional states may be populated in emotional therapy training data based on expert inputs and/or on established wellbeing models such as the Six Factors of Psychological WellBeing model, or the like.

Still referring to FIG. 4, computer device 104 may generate an emotional therapy 408 as a function of the current user emotional state 216 and the wellbeing model 224. For instance, an emotional wellbeing model may be developed by training emotional wellbeing model using emotional therapy training data 220. motional therapies may be stored in emotional therapy database 316 in user database 124. Emotional wellbeing model 224 may generate and/or identify emotional therapies as and/or using outputs based on input emotional states. For instance, a response to calm a user down may be included if the user enters a current user emotional activity data 112 such as "I'm worried about my life" indicating that the user is "scared," which may be classified to an emotional state associated with fright. Examples of responses may include, but not limited to, "close your eyes while I play some music," "do you need to call someone," or "let me try to help you", and/or an option to initiate electronic communication with a person or resource that may aid user, followed by additional choices to the user. Wellbeing model 224 may create a repository of emotional therapies which are stored in user database 124 that use the wellbeing model 224 relating emotional therapies and behaviors from a plurality of users. For example, a different user may receive the same responses in the database from generated from the responses and behaviors of another user. Other non-limiting examples of wellbeing models include a psychological wellbeing model, a social wellbeing model, and the like. Alternatively or additionally, computing device may generate an emotional therapy 408 as a function of the current user emotional state 216, the current user emotional activity data 112, and the wellbeing model 224; for instance, training data may match user emotional states and one or more elements of user emotional activity data to one or more emotional therapies, which may result in a wellbeing model that accepts current user emotional activity data and current user emotional state as inputs and outputs emotional therapies.

Figure 5:
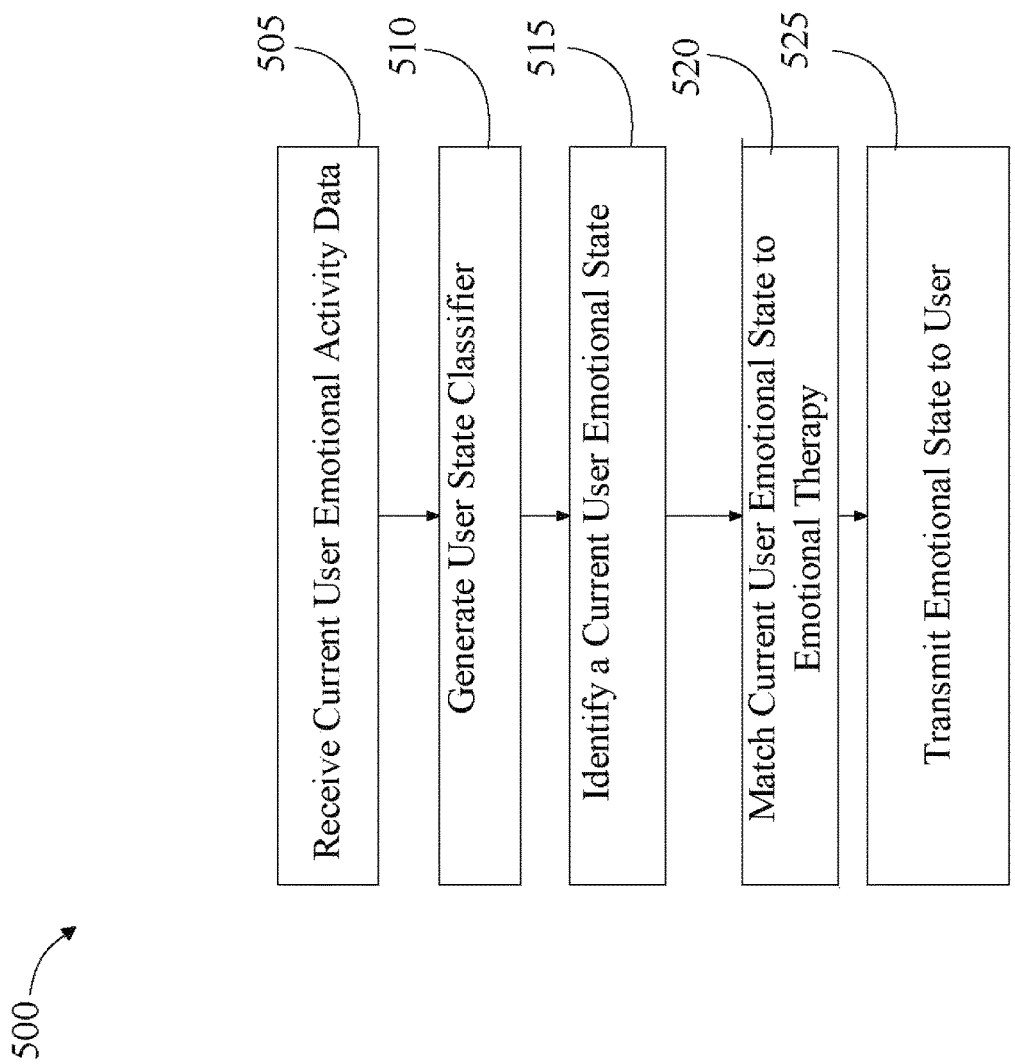
FIG. 5 is a flow diagram illustrating an exemplary embodiment of an iterative textual conversation.

Referring now to FIG. 5 an exemplary embodiment 500 of a method for emotional pattern matching is illustrated. At step 505 a computing device 104 receives current user emotional state data from a user. This may be implemented, without limitation, as described above in FIGS. 1-4. Once user activity is received, the computing device generates a user state classifier.

Still referring to FIG. 5, at step 510, a computing device generates a user state classifier as a function of state training data, where the state training data comprises a plurality of elements of past user emotional data. This may be implemented, without limitation, as described above in FIGS. 1-4. Generating a user state classifier as a function of state training data may include past user emotional from a plurality of users in the state training data used by a user state classifying module. A current user state is identified. The state training database is updated by incorporating a user response to the emotional therapy into the state training database.

Still referring to FIG. 5, at step 515, computing device 104 identifies a current user emotional state using the user state classifier as a function of the user state classifier and the current user emotional state data where the current user emotional state is a function of the emotional wellbeing of the user. This may be implemented, without limitation, as described above in FIGS. 1-4. The method may further identify a current user emotional state using the user state classifier and at least an element of current user emotional state data.

Still referring to FIG. 5, at step 520, a support response module operating in the computing device matches the current user state to an emotional therapy. This may be implemented, without limitation, as described above in FIGS. 1-4. For instance, user may provide the input after a lapse in self-control where the user requires a wellbeing emotional therapy. Alternatively or additionally, another person, potentially from a different remote device, may report that user has engaged in, for example, a troubled behavior. The emotional therapy is sent to the user.

Still referring to FIG. 5, at step 525, the support response module operating in the computing device sends the emotional therapy to the user. This may be implemented, without limitation, as described above in FIGS. 1-4. In an embodiment, the support response module may be configured to enable two factor authentication. The emotional therapy may be non-textual. The emotional therapy may be textual. The emotional therapy may be sent in a language selected by the user. In an embodiment, the emotional therapy may involve performing an iterative an iterative textual conversation with the user where the iterative textual conversation includes transmitting a plurality of user emotional therapy candidates and receiving a user selection of a user emotional therapy from the plurality of emotional therapies candidates. The user may transmit an answer, such as, but not limited to "End" which will conclude the conversation.

Still referring to FIG. 5, emotional therapies may be classified by use of a classification algorithm as a unit. For example, a textual conversation may contain words or phrases such as, but not limited to, "I feel bad," I am sad" and "I am lonely." All of these messages may signify a theme that the user is sad and may be classified as "Sad" state. This theme may be different, if for example, the textual conversation has messages such as, but not limited to, "I feel bad," I am sad," and "I can't live anymore." In the latter case, the combination of text messages may be classified, for example, as an "Troubled" or another state indicating that the user needs assistance.

Still referring to FIG. 5., the support response module may detect a conference event in the user based on at least a user input. The support response module will select an authorized contact from an authorization list based on the location of the user. The support response module may initiate a conference with the authorized contact. This may be implemented, without limitation, as described above in FIGS. 1-4.

Still referring to FIG. 5, the support response module may be further configured to generate a response that includes a conference initiator. The support response module transmits the conference initiator to a user client device of a second user. The support response module facilitates a conversation between the first user and the second user utilizing the conference initiator.

Figure 6:
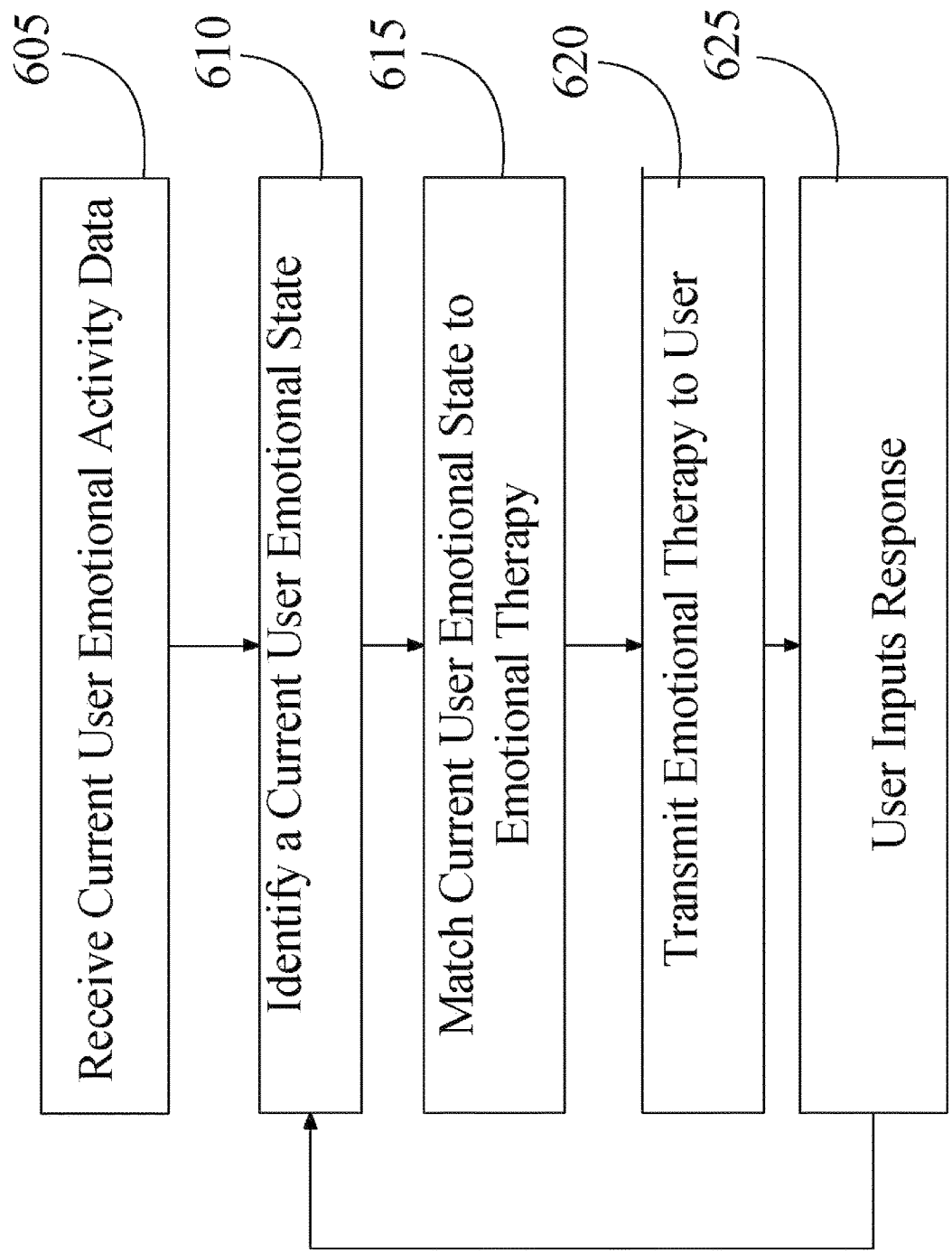
FIG. 6 is a flow diagram illustrating an exemplary embodiment of a method of behavioral pattern matching.

Now referring to FIG. 6, an exemplary embodiment of an iterative textual conversation with a user is illustrated. At step 605 a computing device 104 may receive current user emotional state data from a user. This may be implemented, without limitation, as described above in FIGS. 1-5. For instance, and without limitation, computing device may receive a the user may enter the phrase, "I feel overwhelmed." At step 610, computing device 104 identifies a current user emotional state as a function of current emotional activity data; this may be implemented, without limitation, as described above in FIGS. 1-5. For instance, and without limitation, computing device may use user state classifier 204 to determine a current user emotional state. At step 615, computing device may match a current user emotional state to an emotional therapy; this may be implemented, without limitation, as described above in FIGS. 1-5. At step 620, emotional therapy may be transmitted to a user; this may be implemented, without limitation, as described above in FIGS. 1-5 At step 625, user may input a response to therapy, which may include any response described above in reference to FIGS. 1-5; response may include any form of emotional state activity data as defined above. Response may include a selection of one or more candidate responses transmitted by system 100. Process 600 may repeat iteratively until a termination condition occurs. Termination condition may include, without limitation, that user enters a word that signals user wants to end the conversation or the user state classifier module and/or computing device 104 reaches a time value configured in the system to cause the user state classifier module 108 to timeout. Iteration may include adding each user response to user emotional activity data used to determine a user emotional state using user state classifier 204; in other words, additional data provided by user in one or more such responses may be used to reclassify user emotional activity data to an emotional state. User responses may alternatively or additionally include feedback regarding emotional therapy. For instance, user may reject one emotional therapy using an instruction which computing device 104 may receive; computing device may generate a second emotional therapy and/or select a second emotional therapy of a plurality thereof, which may be transmitted to user. Iteration in such a case may return to step 615 instead of step 610, as user emotional state may be unaltered by such an input. User rejection of an emotional therapy may be added to emotional therapy training data 220 for future training of wellbeing model 224.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
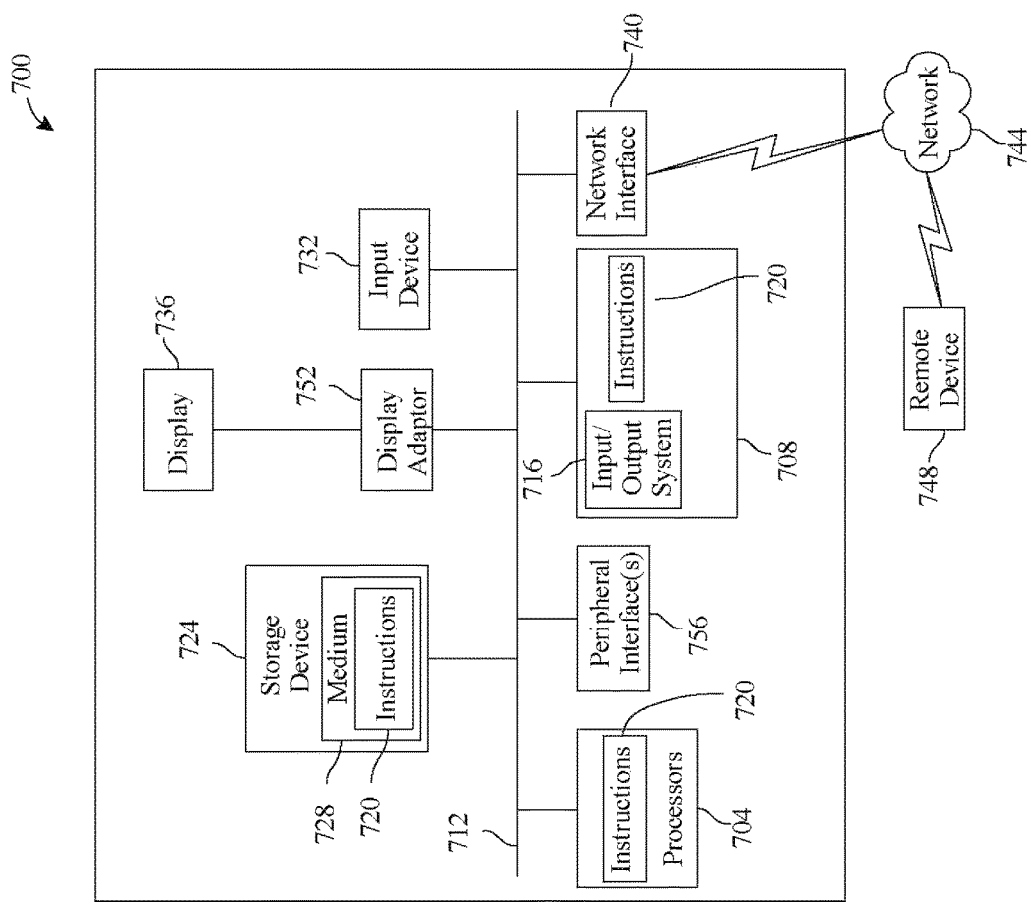
FIG. 7 is a block diagram of a computing system that can be used to implement any one or more of the methodologies disclosed herein and any one or more portions thereof.

FIG. 7 shows a diagrammatic representation of one embodiment of a computing device 104 in the exemplary form of a computer system 700 within which a set of instructions for causing a control system to perform any one or more of the aspects and/or methodologies of the present disclosure may be executed. It is also contemplated that multiple servers may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing device 104, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for emotional pattern matching, the system comprising a computing device, wherein the computing device is configured to:
 receive current user emotional activity data from a user and an authorized contact from an authorization list utilizing a support response module operating on the computing device, wherein the current user emotional activity data comprises a location and direction of travel of the user;
 train a user state classifier as a function of state training data and a machine learning algorithm, wherein the state training data comprises a plurality of elements of user emotional activity data correlated with elements of past user emotional state data;
 identify a current user emotional state as a function of the trained user state classifier and the current user emotional activity data, wherein the current user emotional state is a function of an emotional wellbeing of the user, wherein the location and the direction of travel of the user are provided to the trained user state classifier as an input to output the current user emotional state;
 match the current user emotional state to an emotional therapy by:
  receiving emotional therapy training data, wherein the emotional therapy training data includes a plurality of combinations of user emotional state data and correlated emotional therapies;
  generating, as a function of a machine-learning process, an emotional wellbeing model as a function of the emotional therapy training data;
  adding user rejection of the emotional therapy to the emotional therapy training data; and
  retraining the emotional wellbeing model as a function of the emotional therapy training data; and
 generating the emotional therapy as a function of the current user emotional state and the emotional wellbeing model, wherein generating the emotional therapy comprises:
  selecting one authorized contact from the authorization list of contacts as a function of the location of the user, such that the one authorized contact is closest to the location of the user from the authorization list of contacts, wherein the authorization list comprises family members for the user; and
  initiating a call to the authorized contact to provide assistance to the user;
 transmit the emotional therapy to the user;
 receive a user response to the emotional therapy;
 update the state training data as a function of the user response; and
 retrain the user state classifier using the updated state training data to generate an updated user state classifier.

2. The system of claim 1, wherein the support response module is further configured to perform two factor authentication of the user.

3. The system of claim 1, wherein the emotional therapy includes a non-textual response.

4. The system of claim 1, wherein the emotional therapy includes a textual response.

5. The system of claim 1, wherein the state training data includes past user emotional state data from a plurality of users.

6. The system of claim 1, wherein the computing device is further configured to update the state training data by incorporating the user response to the emotional therapy into the state training data.

7. The system of claim 1, wherein the system is configured to perform an iterative textual conversation with the user, the iterative textual conversation including transmitting by the computing device, a plurality of emotional therapy candidates and receiving a user selection of a user emotional therapy candidate from the plurality of user emotional therapy candidates.

8. The system of claim 1, wherein the computing device is further configured to retrieve the emotional therapy from a wellbeing response repository as a function of the current user emotional state.

9. The system of claim 1, wherein the computing device is further configured to:
 generate the emotional therapy, wherein the emotional therapy contains a conference initiator;
 transmit the conference initiator to a user client device of a first user;
 transmit the conference initiator to a user client device of a second user; and
 facilitate a conversation between the first user and the second user utilizing the conference initiator.

10. A method of emotional pattern matching, the method comprising:

receiving current user emotional activity data from a user and an authorized contact from an authorization list utilizing a support response module operating on a computing device, wherein the current user emotional activity data comprises a location and direction of travel of the user;

training a user state classifier as a function of state training data and a machine learning algorithm, wherein the state training data comprises a plurality of elements of user emotional activity data correlated with elements of past user emotional state data;

identifying a current user emotional state as a function of the trained user state classifier and the current user emotional activity data, wherein the current user emotional state is a function of an emotional wellbeing of the user, wherein the location and the direction of travel of the user are provided to the trained user state classifier as an input to output the current user emotional state;

matching the current user emotional state to an emotional therapy by:

receiving emotional therapy training data, wherein the emotional therapy training data includes a plurality of combinations of user emotional state data and correlated emotional therapies;

generating as a function of a machine-learning process an emotional wellbeing model as a function of the emotional therapy training data;

adding user rejection of the emotional therapy to the emotional therapy training data; and retraining the emotional wellbeing model as a function of the emotional therapy training data; and generating the emotional therapy as a function of the current user emotional state and the emotional wellbeing model, wherein generating the emotional therapy includes:

selecting one authorized contact from the authorization list of contacts as a function of the location of the user, such that the one authorized contact is closest to the location of the user from the authorization list of contacts, wherein the authorization list of contacts comprises family members for the user; and initiating a call to the authorized contact to provide assistance to the user;

transmitting the emotional therapy to the user;

receiving a user response to the emotional therapy;

updating the state training data as a function of the user response; and retraining the user state classifier using the updated state training data to generate an updated user state classifier.

11. The method of claim 10, further comprising performing two factor authentication of the user.

12. The method of claim 10, wherein the emotional therapy includes a non-textual response.

13. The method of claim 10, wherein the emotional therapy includes a textual response.

14. The method of claim 10, wherein generating the user state classifier based on the state training data further comprises including past user emotional data from a plurality of users in the state training data used by a user state classifier module.

15. The method of claim 10, further comprising updating the state training data by incorporating the user response to the emotional therapy into the state training data.

16. The method of claim 10, further comprising performing an iterative textual conversation with the user, the iterative textual conversation including transmitting by the computing device, a plurality of emotional therapy candidates and receiving a user selection of a user emotional therapy candidate from the plurality of emotional therapy candidates.

17. The method of claim 10, wherein the method further comprises retrieving the emotional response from a wellbeing response repository as a function of the current user emotional state.

18. The method of claim 10, wherein transmitting the emotional therapy to the user further comprises:

generating the emotional therapy, wherein the emotional therapy contains a conference initiator;

transmitting the conference initiator to a user client device of a first user;

transmitting the conference initiator to a user client device of a second user; and facilitating a conversation between the first user and the second user utilizing the conference initiator.

* * * * *